(12) United States Patent
Kuo et al.

(10) Patent No.: US 7,397,984 B2
(45) Date of Patent: Jul. 8, 2008

(54) LIGHT GUIDE SCREEN LOUVER DEVICE

(75) Inventors: Huei Pei Kuo, Palo Alto, CA (US);
Lawrence M. Hubby, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 252 days.

(21) Appl. No.: 11/263,728

(22) Filed: Nov. 1, 2005

(65) Prior Publication Data

US 2007/0097707 A1    May 3, 2007

(51) Int. Cl.
*G02B 6/26* (2006.01)
*G02B 6/42* (2006.01)
*F21V 7/00* (2006.01)
*F21V 7/04* (2006.01)

(52) U.S. Cl. ............................ 385/33; 385/31; 385/39;
385/901; 362/279; 362/290; 362/325; 362/330;
362/342; 362/354; 362/615; 362/616; 362/619;
362/622; 362/627; 349/62; 349/63; 349/66

(58) Field of Classification Search ................. 385/33;
362/290, 342, 354, 615, 616, 619, 622; 349/66
See application file for complete search history.

(56) References Cited

U.S. PATENT DOCUMENTS

| 3,043,910 | A   | * | 7/1962 | Hicks, Jr. ............... 348/804 |
| 4,929,048 | A   |   | 5/1990 | Cuypers |
| 5,293,305 | A   | * | 3/1994 | Koster ................... 362/147 |
| 5,917,565 | A   | * | 6/1999 | Suzuki .................... 349/65 |
| 6,219,483 | B1  | * | 4/2001 | Sugawara et al. ........... 385/120 |
| 6,550,937 | B2  |   | 4/2003 | Glass |
| 6,571,043 | B1  |   | 5/2003 | Lowry et al. |
| 2006/0034099 | A1 | * | 2/2006 | Yang et al. ............... 362/615 |
| 2006/0176554 | A1 | * | 8/2006 | Kuo et al. ................ 359/460 |
| 2006/0176556 | A1 | * | 8/2006 | Kuo et al. ................ 359/460 |

* cited by examiner

*Primary Examiner*—Frank G Font
*Assistant Examiner*—Ryan Lepisto (57) ABSTRACT

In a particular embodiment, the louver device includes a transparent layer of material having a first surface and, parallel thereto, a second surface. A plurality of shaped louver members are disposed within the transparent layer of material. The shaped louver members are aligned to receive light entering the first surface at a first angle relative to the first surface and direct the light out the second surface at a plurality of angles relative to the second surface.

28 Claims, 7 Drawing Sheets

FIG. 12

LIGHT GUIDE SCREEN LOUVER DEVICE

RELATED APPLICATIONS

This application is related to commonly owned U.S. patent application Ser. No. 10/698,829, filed on Oct. 31, 2003 by inventors Huei Pei Kuo, Lawrence M. Hubby, Jr. and Steven L. Naberhuis and entitled "Light Guide Apparatus For Use In Rear Projection Display Environments", herein incorporated by reference.

FIELD

This invention relates generally to the field of display devices and, in particular, to a louver device for a light guide screen.

BACKGROUND

Socially and professionally, most people rely upon video displays in one form or another for at least a portion of their work and/or recreation. With a growing demand for large screens, such as high definition television (HDTV), cathode ray tubes (CRTs) have largely given way to displays composed of liquid crystal devices (LCDs), plasma display panels (PDPs), or front or rear projection systems.

A CRT operates by scanning electron beam(s) that excite phosphor materials on the back side of a transparent screen, wherein the intensity of each pixel is commonly tied to the intensity of the electron beam. With a PDP, each pixel is an individual light-emitting device capable of generating its own light. With an LCD, each pixel is a back-lit, light modulating liquid crystal device.

As neither system utilizes a large tube, LCD and PDP screens may be quite thin and often are lighter than comparable CRT displays. However, the manufacturing process for LCDs, PDPs and most other flat panel displays is much more complex and intensive with respect to both equipment and materials than that of CRTs, typically resulting in higher selling prices.

Projection systems offer alternatives to PDP and LCD based systems. In many cases, projection display systems are less expensive than comparably sized PDP or LCD display systems. Rear projection display systems typically employ a wide angle projection lens (or multiple lenses), operating in connection with one or more reflective surfaces to direct light received from the projector through the lens(es) to the back of a screen. The lens and mirror arrangement typically enlarges the image as well.

To accommodate the projector, one or more lenses, and reflectors, rear projection displays are typically 18 to 20 inches deep and not suitable for on-wall mounting. A typical rear projection system offering a 55-inch HDTV screen may weigh less than a comparable CRT, but at two hundred pounds or more it may be difficult and awkward to install and support.

Often, rear projection display devices exhibit average or below average picture quality in certain environments. For example, rear projection displays may be difficult to see when viewed from particular angles within a room setting or when light varies within the environment. Aside from a theatrical setting, light output and contrast is a constant issue in most settings and viewing environments.

Despite advancements in projectors and enhanced lens elements, the lens and reflector design remains generally unchanged and tends to be a limiting factor in both picture quality and overall display system thickness.

A display may also have to contend with two types of contrast—dark room contrast and light room contrast. Dark room contrast is simply the contrast between light and dark image objects in a dark environment such as a theater setting. Light room contrast is simply the contrast between light and dark image objects in a light environment. Front projection systems typically provide good dark room contrast where ambient light is minimized but, as they rely on a screen reflector, they are subject to poor light room contrast due to the interference of ambient light.

Rear projection displays, LEDs, LCDs and PDPs typically provide better light room contrast than front projection systems. However, ambient light striking the viewing surface can be an issue for viewers and buying consumers. Ambient light is oftentimes highly variable. For typical consumers, what makes a display attractive is often high contrast in a bright room.

A developing variation of rear projection displays utilizes light guides, such as optical fibers, to route an image from an input location to an output location and magnify the image. Such displays may be referred to as light guide screens (LGSs). In certain configurations; however, light guide screens may lose a percentage of light and, thus, the brightness of the image, by permitting the light to venture off in directions other than substantially towards the viewing audience. This loss of light may in some instances amount to fifty percent (50%) of the light provided to the input ends of the light guides.

In addition, in some configurations, the viewing angle of the complete screen may be limited to the angular range corresponding to the acceptance angle of the light guides used in construction of the screen. With respect to light guides, the acceptance angle is the half-angle of the cone within which incident light is totally internally reflected by the fiber core. Further, this range of viewing angles may not be out in front of the screen, but may be more heavily concentrated to the right, left, top or bottom, depending on the direction the light guides approach the screen from behind.

Weight, thickness, durability, cost, aesthetic appearance, and quality are key considerations for rear projection display systems and display screens. As such, there is a need for reducing the loss of light that is likely with a light guide screen.

Hence, there is a need for a device that overcomes one or more of the drawbacks identified above.

SUMMARY

This invention provides a louver device for use with a light guide screen.

In particular and by way of example only, according to an embodiment, provided is a light guide screen louver device, including: a transparent layer of material having a first surface and, parallel thereto, a second surface; a plurality of shaped louver members disposed within the transparent layer of material, the shaped louver members aligned to receive light entering the first surface at a first angle relative to the first surface and direct the light out the second surface at a plurality of angles relative to the second surface.

DETAILED DESCRIPTION

Before proceeding with the detailed description, it is to be appreciated that the present teaching is by way of example, not by limitation. The concepts herein are not limited to use or application with a specific light guide screen. Thus, although the instrumentalities described herein are for the convenience of explanation, shown and described with respect to exemplary embodiments, it will be appreciated that the principles herein may be equally applied in other types light guide screen display systems.

Figure 1:
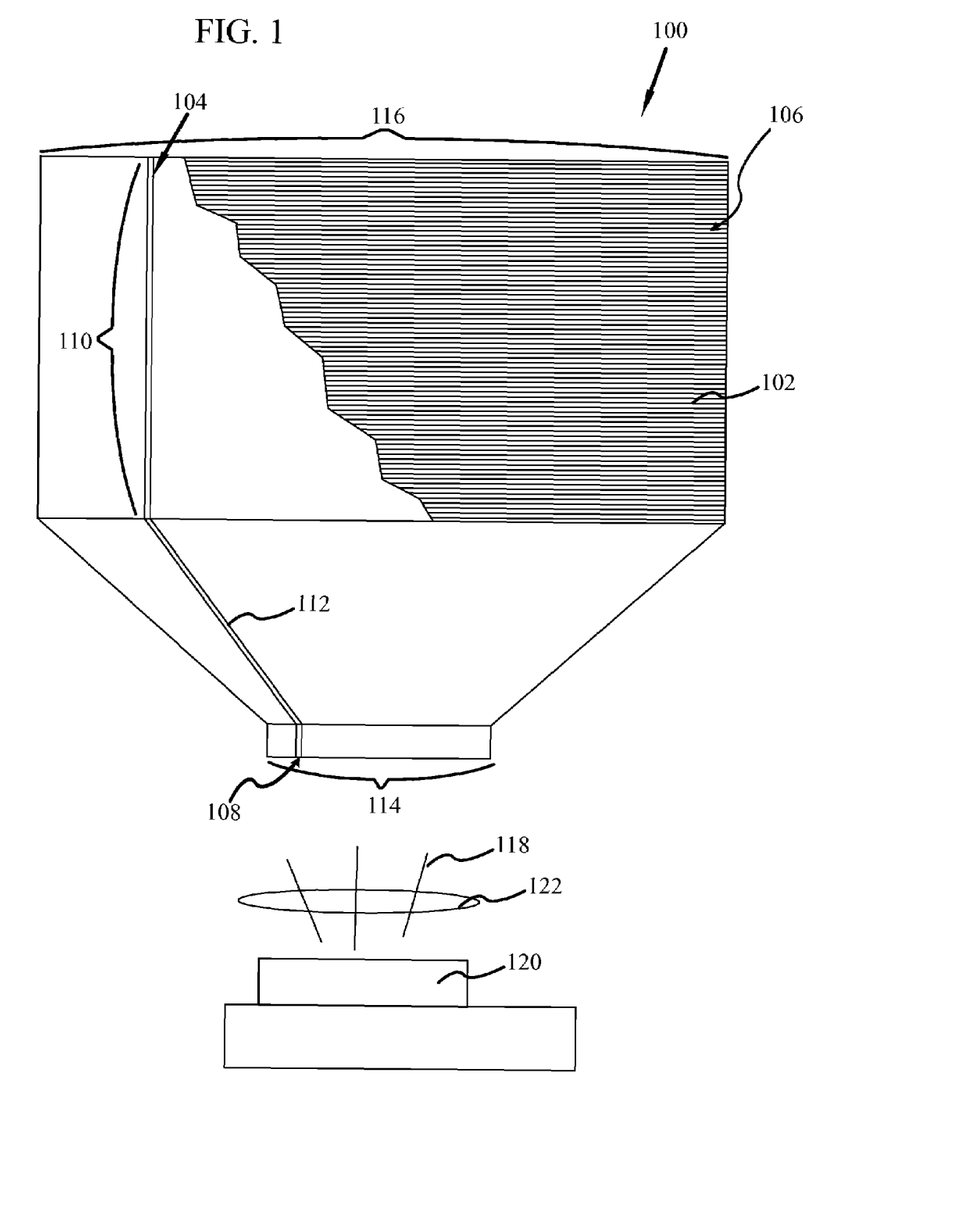
FIG. 1 shows a schematic diagram of a light guide screen with louver device according to an embodiment.

FIG. 1 conceptually illustrates a portion of a light guide screen (LGS) 100 with a louver layer 102 having a plurality of shaped louver members as further described below. In at least one embodiment, LGS 100 has a plurality of aligned magnifying layers 104 providing a viewing surface 106. Specifically, the magnifying layers 104 each provide an input location 108, a magnifying output location 110 and, in at least one embodiment, a flexible midsection 112.

In at least one embodiment as shown, each magnifying layer 104 provides one vertical slice of the viewing surface 106. In an alternative embodiment, not shown, each magnifying layer 104 provides one horizontal slice of the viewing surface 106.

In at least one embodiment, collectively, input locations 108 of each magnifying layer 104 provide input surface 114. Collectively, output locations 110 of each magnifying layer 104 provide output face 116.

An image (e.g., in the form of light 118) is projected upon input surface 114. Such an image may be provided in at least one embodiment by an image source 120, proximate to input surface 114. A lens 122 may optically couple the image source 120 to the input surface 114, or the lens 122 may be an integral part of the image source 120.

Image source 120 may be any device capable of providing a visual image, such as, for example, a projector. Image source 120 is not limited simply to this example, and may also include combinations of devices. For example, multiple light/image sources (such as red, green and blue illuminated liquid crystal light valves) may be used as well. As is further discussed below, the image focused upon the input surface 114 is expanded to appear upon the viewing surface 106.

Figure 2:
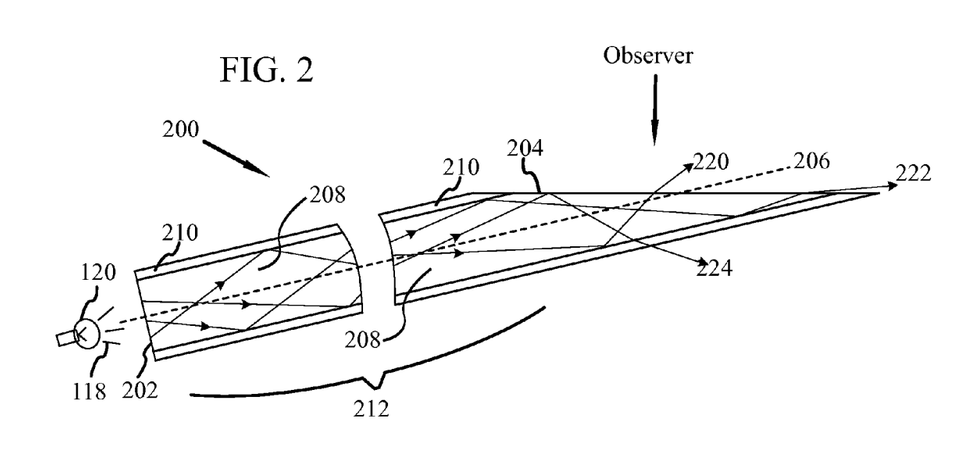
FIG. 2 shows a partial cross-sectional view of a light guide element.

FIG. 2 conceptually illustrates a cross section of a single light guide 200, having an input end 202 and an output end 204. As shown, input end may be substantially perpendicular to longitudinal centerline 206. Output end 204 is at an acute angle relative to the longitudinal centerline 206. In other words, output end 204 is beveled. As such, the dimension of the output end 204 in the plane of the paper is longer than the input end 104.

It is understood and appreciated that light guides 200 as used herein are cladded light guides. Each light guide 200 consists of a core 208 that is substantially optically clean and a circumferential cladding 210. The core has an index of refraction n1, and the clad has an index of refraction n2, wherein n1>n2. Further, in at least one embodiment, the midsection 212 of light guide 200 is a flexible midsection.

In at least one embodiment, each light guide 200 is preferably substantially totally internally reflecting such that the light, illustrated as lines 220-224, received at the input end 202 is substantially delivered to the magnifying output end 204 with minimal loss. Total internal reflection, or TIR, is the reflection of all incident light off a boundary between clad 210 and core 208. TIR occurs when a light ray is both in a medium of higher index of refraction and approaches a medium of lower index of refraction, and the angle of incidence for the light ray is greater than the "critical angle."

The critical angle is defined as the smallest angle of incidence measured with respect to a line normal to the boundary between two optical media for which light is refracted at an exit angle of ninety degrees (90°)—that is, the light propagates along the boundary—when the light impinges on the boundary from the side of higher index of refraction. For any angle of incidence greater than the critical angle, the light traveling through the medium with a higher index of refraction will undergo total internal reflection. The value of the critical angle depends upon the combination of materials present on each side of the boundary.

The use of light guides 200 with TIR qualities is generally advantageous permitting, for example, selection of the length of the light guides 200 and location of the input end to minimize thickness of the light guide screen and/or improve service access to light source without substantially diminishing the quantity of light delivered by each light guide 200 to output end 204, and consequently the viewing surface 106.

Figure 3:
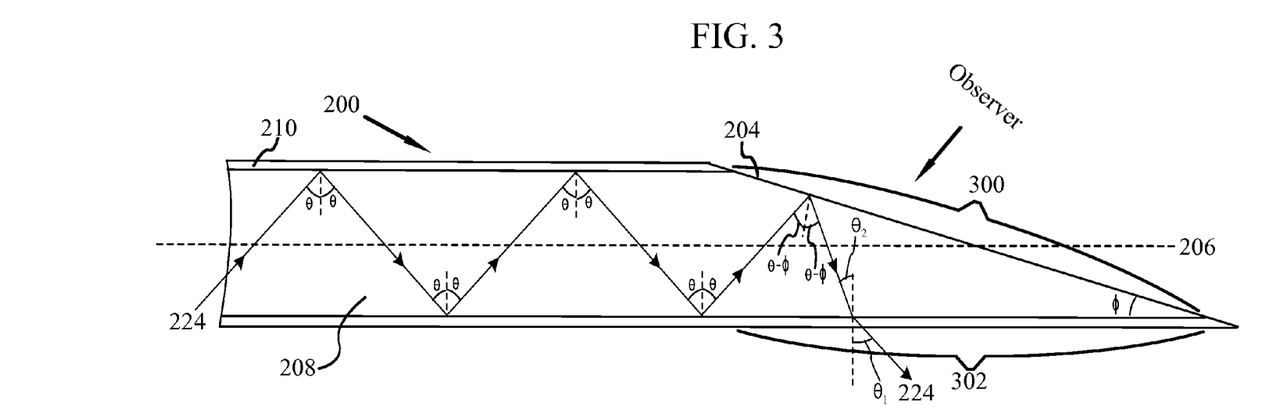
FIG. 3 shows an enlarged view of the light guide element in FIG. 2.

FIG. 3 is an enlarged portion of light guide 200 provided to further illustrate the possible propagation of a light ray 224. Light ray 224 travels in light guide 200 through successive TIR, as shown in FIG. 3. The angle of incidence and reflection remains unchanged at angle $\theta$. When the light ray 224 enters the tapered section of output end 204, the incident angle decreases by $\Phi$ at each successive TIR. After x bounces into the tapered section, the incident angle becomes $\theta_2 = \theta - x\Phi$. When $\theta_2$ becomes less than the critical angle, light ray 224 exits the light guide 200 at an angle $\theta_1$, where $\theta_1$ is defined by the following equations, wherein $n_2$ is the index of refraction of the core and $n_1$ is the index of refraction for the clad:

$$n_2 > n_1$$

$$\theta_2 < \theta_1$$

$$n_2 \sin \theta_2 = n_1 \sin \theta_1$$

Typically, $\theta_1 > 60°$ and light ray 224 can exit either from front surface 300 of output end 204 or the back surface 302 of output end 204. When viewed from a direction perpendicular to output end 204, the light ray 224 exiting back surface 302 cannot reach the observer and is wasted.

Within a typical light guide 200 such as, for example, an optical fiber, the spread of light to either side of longitudinal centerline 206 is typically about thirty degrees (30°). Although the angle of output end 204 may provide a flat surface transverse to an observer, exiting light will continue substantially in the direction last suggested by longitudinal centerline 206 unless reflected or refracted at output end 204.

With respect to FIGS. 2 and 3, as an observer is generally viewing the light guide screen from a position transverse to the output end, light rays 222 and 224 clearly do not reach the observer. Of the three light rays illustrated, only light ray 220 is traveling most generally towards the viewing observer. For ease of illustration and understanding the light rays 222 and 224 are shown as following generally straight paths entering or leaving the light guide 200. It is to be understood and appreciated that the light rays 222 and 224 undergo a change of direction governed by the Fresnel law of refraction at the interfaces. This slight change in direction is well understood and does not alter the advantageous features of the disclosed embodiments.

Figure 4:
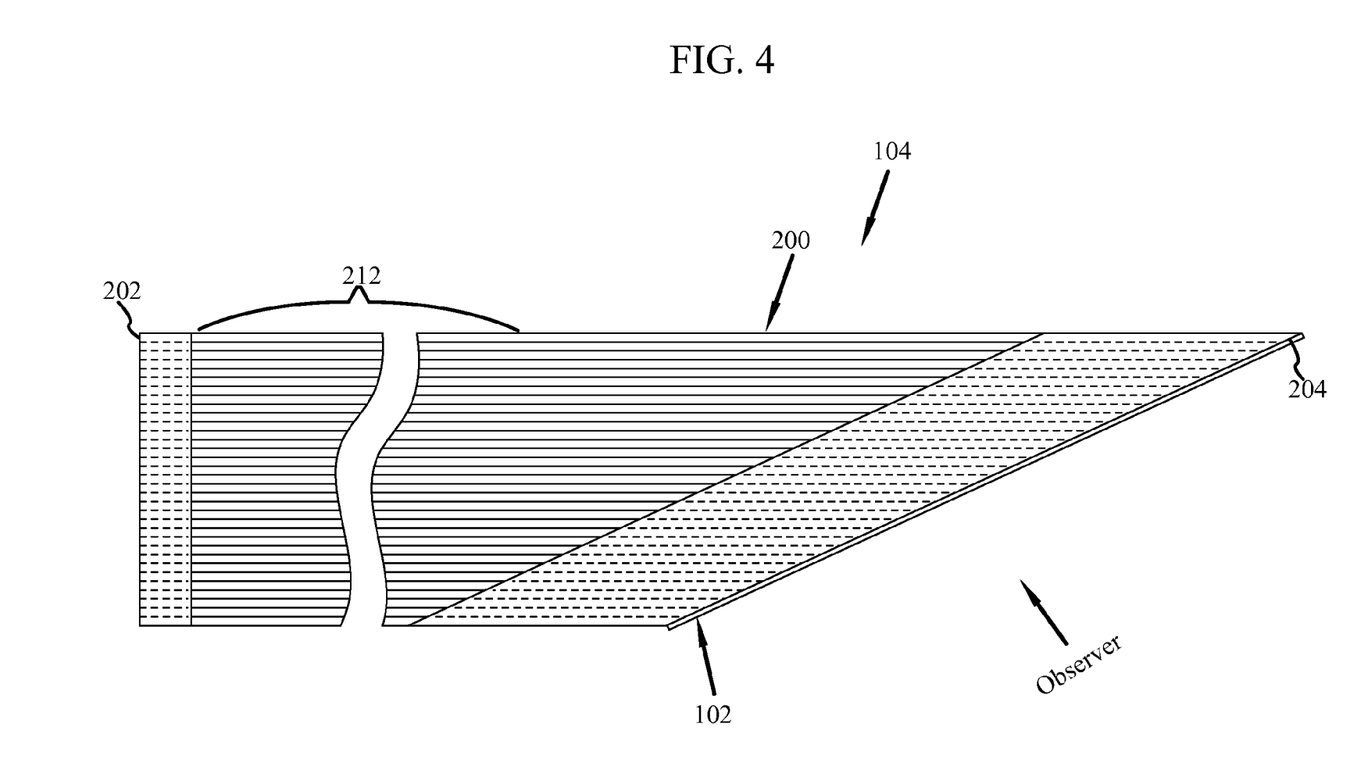
FIG. 4 shows a plane view of a magnifying layer and louver device incorporated in the display shown in FIG. 1.

As shown in FIG. 4, each magnifying layer 104 has a plurality of light guides 200. Shown for the ease of illustration and discussion are thirty-three light guides 200. Embodiments may employ more or fewer light guides 200. The plurality of magnifying output ends 204 are aligned in substantially contiguous parallel contact.

More specifically, the magnifying output ends 204 of the light guides 200 in layer 104 are in substantially contiguous intimate contact, without intervening spacers or material separating each individual magnifying output end 204 from its neighbors on either side. In other words, the magnifying output ends 204 lie next to one another and are in actual contact, touching along their outer surfaces at a point. It is understood and appreciated that the light conveying cores 208 of each light guide 200 are not in contact, rather it is the outer surface of the clad 210 that is in contact.

FIG. 4 also shows a louver layer 102 disposed upon the aligned output ends 204. Louver layer 102 advantageously reduces the loss of light and improves the viewing angle provided to an observer, as well as providing other advantages.

Figure 5:
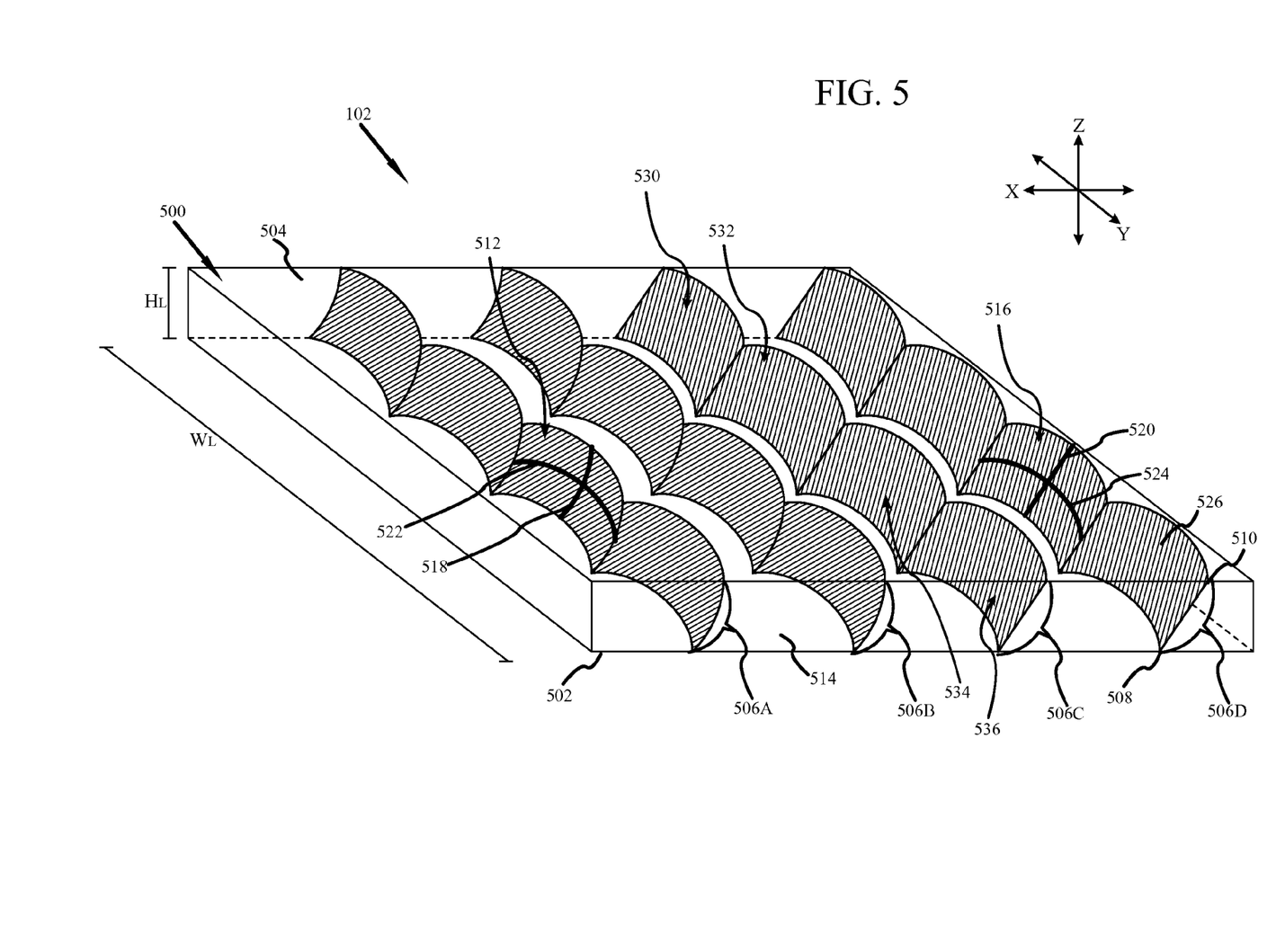
FIG. 5 shows a partial perspective view of the louver device with curved louver members.
Figures 6, 8, 9, 10, 11:
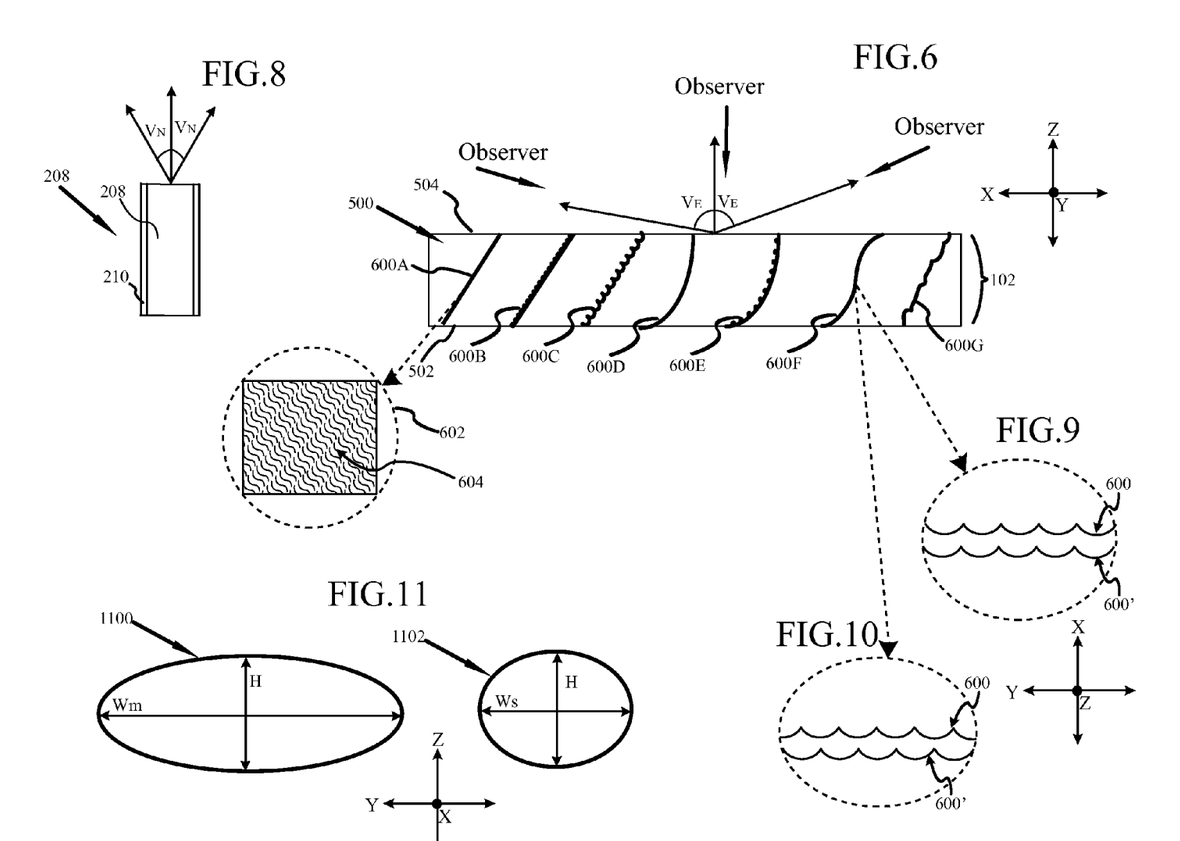
FIG. 6 shows a partial side view of the louver device with a plurality of different curved louver members.
FIG. 8 shows a partial cross section view of a light guide providing a narrow angular viewing range.
FIG. 9 shows parallel rows of louver members in one embodiment.
FIG. 10 shows staggered rows of louver members in an alternative embodiment.
FIG. 11 shows curved louver members of different widths.
Figure 7:
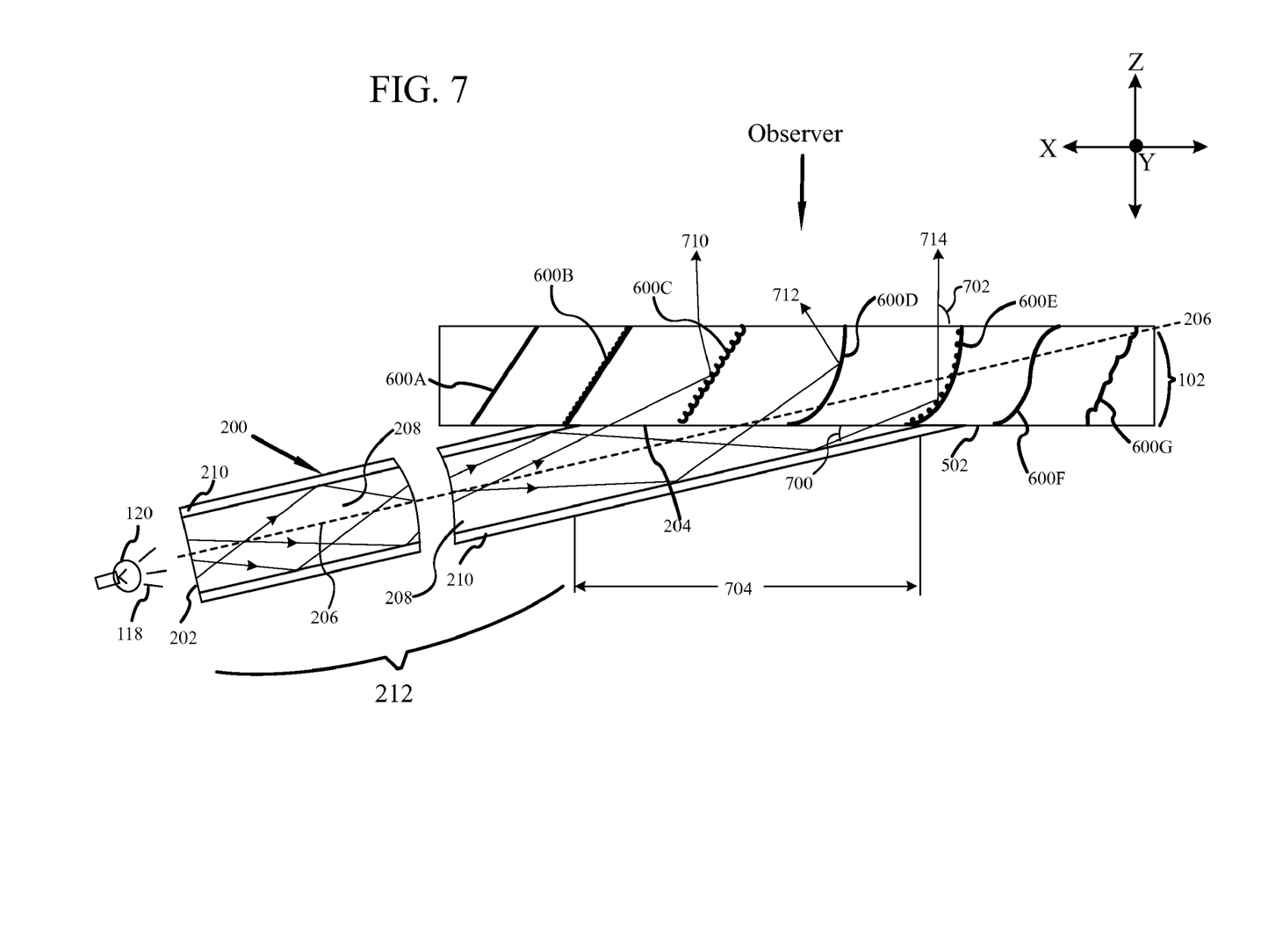
FIG. 7 shows a partial cross-sectional view of a light guide with an attached louver device.

The nature of the louver layer 102 is further shown in FIGS. 5, 6 and 7. FIG. 5 conceptually illustrates an enlarged partial perspective view of louver layer 102. Louver layer 102 consists of a transparent layer 500 of material having a first surface 502 and parallel thereto a second surface 504. A plurality of shaped louver members 506 are disposed at least partially within the transparent layer 500, specifically shaped louver members 506A~506D. In at least one embodiment as shown, shaped louver members 506A~506D are disposed entirely within transparent layer 500. As shown, it is understood and appreciated that each louver member 506 is composed of a plurality of louver member segments of which segments 530, 532, 533 and 534 are exemplary. In at least one embodiment, each louver member segment may be considered to be an individual louver member, the individual segments arranged in rows so as to provide the rows of louver members as shown.

As used herein, the term "transparent" is generally defined to include the definitions of "capable of transmitting light so that objects or images can be seen as if there were no intervening material," and "easily seen through." In at least one embodiment, transparent layer 500 may be aptly described as translucent, in that transparent layer 500 may be colored, polarized and/or intentionally diffusing.

As is further shown in FIG. 5, each shaped louver member 506 has a first end 508 proximate to the first surface 502 and a second end 510 proximate to the second surface 504 and a curvilinear surface 526 therebetween. With respect to exemplary segments 512 and 516, it is also apparent that each has a surface having at least one first slope 518, 520 along a first axis (e.g. Z-axis) and at least one second slope 522, 524 along a second axis (e.g. Y-axis) transverse to the first axis. For each slope 518~524 a steeper slope provides a corresponding larger angle of dispersion for the reflected light received from the first surface 502, and re-directed through the second surface 504.

In at least one embodiment the shaped louver members within louver layer 102 are elliptical mirror segments as exemplified by shaped louver members 506A, 506B, e.g. mirror segment 512 has curved cross section along the first and second surfaces 502, 504 and a curved cross section along side 514. In at least one alternative embodiment, the shaped louver members within louver layer 102 are cylindrical mirror segments, e.g. mirror segment 516 has a curved cross section along the first and second surfaces 502, 504 and a straight cross section along side 514.

Moreover, in at least one embodiment, the shaped louver members within louver layer 102 are substantially identical. In yet another alternative embodiment the shaped louver members 506 within louver layer 102 may be different from one to another, such as for example a mixture of elliptical and cylindrical mirror segments, and or even a mixture of different sized elliptical and/or cylindrical mirror segments. In other words, in at least one alternative embodiment the plurality of shaped louver members 506 may be sub-grouped, each sub-group consisting of at least one shaped louver member. In such a configuration, the one or more members within each sub-group are substantially identical, but different from the members of another subgroup.

With respect to FIG. 5, shaped louver members 506A~506D are each illustrated as having four sections for ease of discussion and illustration. It is to be understood that each louver member may have one section or as shown, consists of many identifiable sections. Moreover, in at least one embodiment, each section, e.g. 512 or 516 is a separate identifiable shaped louver member.

As is further illustrated in FIGS. 6 and 7, shaped louver members 506 are aligned to receive light entering the first surface 502 at a first angle relative to the first surface 502 and direct the light out the second surface 504 at a plurality of angles relative to the second surface 504.

FIG. 6 illustrates an enlarged partial cross section of louver layer 102 illustrating seven different cross sections of shaped louver members 600A~600G for purposes of discussion. Shaped louver members 600 correspond to shaped louver members 506 in FIG. 5, however they have been renumbered in FIG. 6 to facilitate discussion.

As illustrated within the enlarged dotted circle 602 extending from shaped louver member 600A, in at least one embodiment each shaped louver member 600 has a textured surface 604. Such texturing may be achieved by scuffing, sanding, buffing, machining or such other process as may be employed to impart a texture upon the surface of shaped louver member 600. Such texturing may be described as fine, as in the case of shaped louver member 600A or rough as in the case of shaped louver members 600B and 600C showing bumps and dimples.

While bumps, dimples or other surface features may be considered part of a textured surface as well, it is to be appreciated that there are differences in scale such that the features of the texture surface shown in 600B and 600C clearly define the overall shape of the louver members 600B and 600C on a larger scale. In addition, it is understood and appreciated that such bumps, dimples or other surface features whether of a fine scale or rough scale may be randomly distributed across the shaped louver member 600, or specifically patterned. Further they may be of varying size and orientation, and may in certain embodiments overlap. In at least one embodiment the size of the bumps, dimples and or other surface features is generally between about one and one hundred microns Shaped louver member 600D illustrates a curved surface, and shaped louver member 600E illustrates a curved surface incorporating bumps and or dimples. Shaped louver member 600F illustrates a multi-curved surface, and shaped louver member 600G illustrates a jagged curvilinear surface. As FIG. 6 provides a cross section view along the X and Z axis, it should be understood and appreciated that for each shaped louver member 600A~600G similar curved surfaces and texturing will also exist for cross sectional views along other axis views, not shown. Moreover, in the examples of shaped louver members 600B, 600C, 600D, 600E and 600G, each shaped louver member has at least one concave or convex area.

FIG. 7 illustrates a cross section of louver layer 102 upon a single light guide 200. The seven different cross sections of shaped louvers 600A~600G are again provided. As shown, in at least one embodiment shaped louver members 600 are aligned to receive light 118 entering the first surface 502 at a low angle 700 relative to first surface 502 and re-direct light 118 out the second surface 504 at a high angle 702 relative to the second surface 504. As such, in FIG. 7 all three illustrated light arrows 710, 712, 714 are traveling generally towards the viewing observer. Louver layer 102 advantageously enhances contrast as substantially all of the light 118 provided to first surface 502 by output end 204 is redirected through second surface 504 towards an observer.

As stated with respect to FIG. 5, each shaped louver member has at least one first slope and transverse thereto, a second slope. These slopes provide focusing power in the horizontal and vertical directions to spread light 118 emerging from second surface 504 over a desired viewing zone. More specifically, as stated above, for a typical light guide such as an optical fiber, the spread of light to either side of longitudinal centerline is typically about thirty degrees (30°). In other words the angular viewing range provided by light guide 200 is typically narrow, see angle $V_N$ shown in FIG. 8. Louver layer 102 advantageously increases the angular viewing range. In at least one embodiment, this improved viewing angle is about 60°~80° in the horizontal direction (e.g., $V_E$ shown in FIG. 6) and about 25°~40° in the vertical direction. Such an improved viewing angle permits a larger audience viewing zone for observers to view and enjoy LGS 100.

As stated above, in at least one embodiment, shaped louver members 506 are textured. Such texturing provides a plurality of reflective points and therefore further enhances the viewing zone.

The image presented by the viewing surface 106 to an observer of LGS 100 is composed of a plurality of pixels. With respect to FIG. 7, the output end 204 of each light guide 200 may define the length and/or height of each pixel. The cross-sectional view provided in FIG. 7 shows the cross section dimension 704 of a single pixel.

So as to effectively redirect light 118 from output end 204 to an observer, the shaped louver members 600 are aligned to transversely cross output end 204. Output ends 204 repeat with periodicity in providing the viewing surface 106 of LGS 100. The shaped louver members 600 also repeat with periodicity. In at least one embodiment, shaped louver members 600 are spaced at regular intervals over the light guides 200 of each layer along the X axis as shown in FIG. 7.

When two periodic structures are close to the same periodicity or simple fractions thereof and disposed proximate to one another, visible fringe patterns may occur. In at least one embodiment, the potential for such fringe patterns may be significantly reduced by spacing shaped louver members 600 at intervals about one-third the horizontal dimension 704 of each pixel. Such an interval is optimal for pixel resolution with reduction in fringing patterns. There is little change if the intervals are smaller. However, as intervals approach ½ or more of the pixel size, fringing patterns become problematic and resolution can be degraded.

Figure 12:
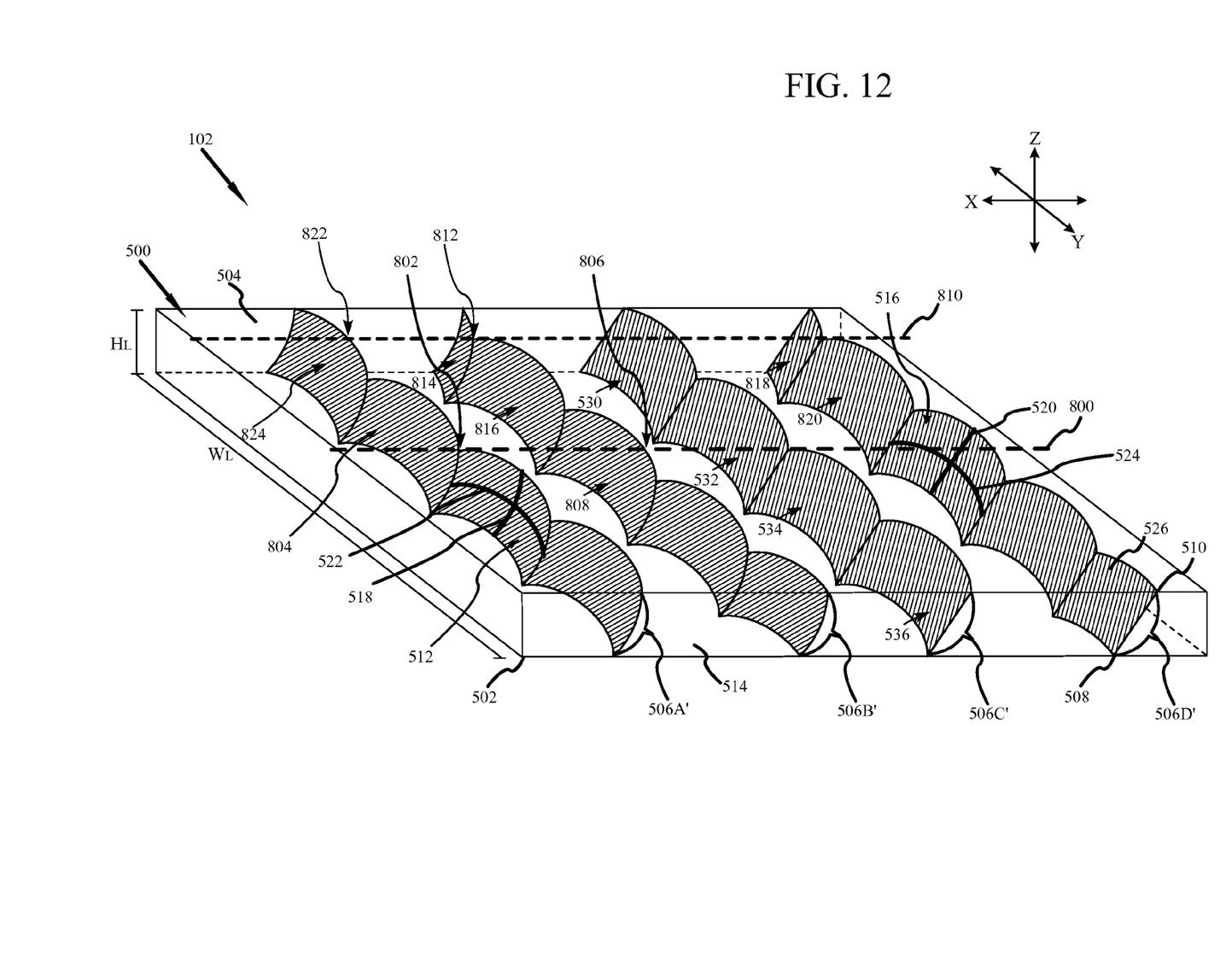
FIG. 12 shows a partial perspective view of the louver device with shaped louver members in staggered rows.

FIGS. 9 and 10 conceptually illustrate different embodiments with respect to how the shaped louver members 600, 600' are arranged with respect to the Y-axis. FIG. 9 illustrates the cross section of two louver members arranged in parallel rows. FIG. 10 illustrates two similar cross sections, however in contrast to the parallel row arrangement in FIG. 9, in FIG. 10, the shaped louver members 600, 600' are arranged in staggered rows. FIG. 12 provides a perspective view of the staggered row arrangement. It is to be understood and appreciated that the illustrations of cross sections as a plurality of curved elements is not suggestive of a limitation. Indeed other geometries and configurations may be employed, including but not limited to flat, trapezoidal, angular as well as continuous shaped louver members having a plurality of segments or individual shaped louver members having only one segment.

FIG. 12 closely resembles the perspective view presented in FIG. 5 as discussed above. In FIG. 12 however, rows of shaped louver members 506B' and 506D' are shown to be staggered (as suggested by FIG. 10) with respect to rows of shaped louver members 506A' and 506C'. More specifically dotted line 800 is imposed upon the common edge 802 between louver member segments 512 and 804, and louver member segment 532 and 534, yet strikes only the mid portion 806 of louver member segment 808 and louver member segment 516. Similarly, dotted line 810 is imposed upon the common edge 812 between louver member segments 814 and 816, and louver member segments 818 and 820, yet strikes only the mid portion 822 of louver member segment 824 and 530. Although the offset between louver members 506A' and 506B' is the same as the offset between louver members 506C' and 506D', it is understood and appreciated that in alternative embodiments the staggering of the rows may be random or set to a different repeating cycle.

Returning for a moment to FIG. 5, it may be appreciated that transparent layer 500 has a height $H_L$, and a width $W_L$. FIG. 11 illustrates two different shaped louver members 1100 and 1102. Shaped louver members 1100 and 1102 each have a height H that is at least as great as $H_L$ of transparent layer 500. Shaped louver member 1100 has a width $W_M$ that is longer than the width of a single light guide, i.e. shaped louver member 1100 spans many light guides. Moreover, in at least one embodiment, shaped louver member 1100 has a width $W_M$ that is equal to the width $W_L$ of transparent layer 500. In contrast, shaped louver member 1102 has a width $W_S$ that is equal to the width of a single light guide.

Shaped louver members 600 are light-reflective in one embodiment in that they are either coated with a light-reflective material or are established from a light-reflective material, such as, but not limited to, silver or aluminum. In either case, the light-reflective material is sufficiently thick so as to not be light transmissive. In an embodiment utilizing silver, the thickness of the silver material may be about one-thousand angstroms thick. The surfaces of shaped louver members 600 may also be textured.

In an alternative embodiment, shaped louver members 600 are established from a light transmissive material having a different index of refraction from transparent layer 500. As the indices of refraction are different, shaped louver members 600 will bend and/or reflect light in specific ways depending on the angle of incidence.

In yet another alternative embodiment, shaped louver members are coated with a holographic film or textured so as to provide physical relief holograms. These holograms are of mirror segments and serve to further enhance the dispersion of light though the second surface 504 to an enhanced viewing zone.

In at least one embodiment, the index of refraction for transparent layer 500 is substantially the same as the index of refraction of the light guide cores 208 establishing the output face 116 of LGS 100. As such, when louver layer 102 is joined to output ends 204, there is no apparent boundary to disrupt or alter the path of light as it travels from the light guides 200 and into the first surface 502 to encounter a shaped louver member 600. Moreover, a substantially boundaryless union exists between output ends 204 and transparent layer 500.

A boundaryless union may be achieved by coupling louver layer 102 directly to output ends 204 such that substantially no intervening gap or space between the two structures exists. In at least one embodiment, to establish this boundaryless union, a joining agent such as, for example, glue, is selected that has a matched index of refraction.

In at least one embodiment, first surface 502 is configured to permanently join to the aligned output ends 204 as part of LGS 100, such as by a substantially transparent and matched index of refraction glue. In an alternative embodiment, louver layer 102 is configured to removably attach to LGS 100 such as by snaps, a tongue-and-grove system, magnets, Velcro™, screws, or other such appropriate non-permanent attachment device.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A light guide screen louver device, comprising:
   a transparent layer of material having a first surface and, parallel thereto, a second surface;
   a plurality of shaped louver members composed of a plurality of louver member segments disposed within the transparent layer of material, the shaped louver members aligned to receive light entering the first surface at a first angle relative to the first surface and direct the light out the second surface at a plurality of angles relative to the second surface;
   wherein each shaped louver member segment is a cylindrical or elliptical mirror segment.

2. The louver device of claim 1, wherein each shaped louver member has a textured surface.

3. The louver device of claim 1, wherein each shaped louver member has a plurality of dimples and or bumps as surface features.

4. The louver device of claim 3, wherein the dimples and or bumps are randomly distributed across the shaped louver member.

5. The louver device of claim 1, wherein each shaped louver member has at least one concave or convex area.

6. The louver device of claim 1, wherein the transparent layer has a height and a width, each shaped louver member having a height equal to the transparent layer height.

7. The louver device of claim 6, wherein each shaped louver member has a width equal to the width of the transparent layer.

8. The louver device of claim 1, wherein each shaped louver member has a first end proximate to the first surface and a second end proximate to the second surface and a curvilinear surface between the first end and the second end.

9. The louver device of claim 1, wherein the shaped louver members are arranged such that the louver member segments are in parallel rows.

10. The louver device of claim 1, wherein the shaped louver members are arranged such that the louver member segments are in staggered rows.

11. The louver device of claim 1, wherein the shaped louver members are transverse to the light provided to the first surface by the light guide screen.

12. The louver device of claim 1, wherein each shaped louver member is structured and arranged to accept light entering from the first surface with a narrow angular viewing range and provide the light through the second surface with an increased angular viewing range.

13. A light guide screen louver device, comprising:
   a transparent layer of material having a first surface and, parallel thereto, a second surface;
   a light redirection means for receiving light presented through the first surface at a first angle with a low angular range and increasing the angular range as the light is directed through the second surface at a plurality of angles relative to the second surface;
   wherein the means for receiving light and increasing the angular range is a shaped louver member composed of a plurality of louver member segments, each louver member having at least one concave or convex area.

14. The louver device of claim 13, wherein the shaped louver member has a textured surface.

15. The louver device of claim 13, wherein each shaped louver member segment has a surface having at least one first slope along a first axis and at least one second slope along a second axis transverse to the first axis, wherein for each slope a steeper slope provides a corresponding larger angle of dispersion.

16. The louver device of claim 13, wherein each shaped louver member has a first end proximate to the first surface and a second end proximate to the second surface and a curvilinear surface between the first end and the second end.

17. The louver device of claim 13, wherein the shaped louver members are arranged such that the louver member segments are in staggered rows.

18. The louver device of claim 13, wherein each shaped louver member segment is a cylindrical or elliptical mirror segment.

19. A light guide display comprising:
   a plurality of rows, each row including a plurality of light guides, each light guide having a light transmitting core and an index of refraction, each light guide having an input end and an output end, the plurality of output ends collectively grouped as an output location;
   a transparent layer of material having a first surface adjacent to the output location and parallel thereto a second surface, the transparent layer of material having an index of refraction matched to the index of refraction of the light guide course; and
   a plurality of shaped louver members composed of a plurality of louver member segments disposed within the transparent layer of material, each shaped louver member having at least one concave or convex area, the shaped louver members aligned to receive light entering the first surface at a low angle relative to the first surface and direct the light out the second surface at a plurality of angles relative to the second surface.

20. The light guide display of claim 19, wherein each shaped louver member has a first end proximate to the first surface and a second end proximate to the second surface and a curvilinear reflective surface between the first end and the second end.

21. The light guide display of claim 19, wherein each shaped louver member has a textured reflective surface.

22. The light guide display of claim 19, wherein each shaped louver member is structured and arranged to accept light entering from the first surface with a narrow angular viewing range and provide the light through the second surface with an increased angular viewing range.

23. The louver device of claim 19, wherein the shaped louver members are arranged such that the louver member segments are in staggered rows.

24. The louver device of claim 19, wherein each shaped louver member segment is a cylindrical or elliptical mirror segment.

25. A light guide display comprising:
a case;
a plurality of rows disposed within the case, each row including a plurality of light guides, each light guide having a light transmitting core and an index of refraction, each light guide having an input end and an output end, the plurality of output ends collectively grouped as an output location, the plurality of input ends collectively grouped as an input surface;
a transparent layer of material having a first surface adjacent to the output location and parallel thereto a second surface, the transparent layer of material having an index of refraction matched to the index of refraction of the light guide core;
a plurality of shaped louver members composed of a plurality of louver member segments disposed within the transparent layer of material, each shaped louver member seciment a cylindrical or elliptical mirror seciment, the shaped louver members aligned to receive light entering the first surface at a first angle relative to the first surface and direct the light out the second surface at a plurality of angles relative to the second surface; and
at least one image source proximate to the input surface.

26. The light guide display of claim 25, wherein each shaped louver member is structured and arranged to accept light entering from the first surface with a narrow angular viewing range and provide the light through the second surface with an increased angular viewing range.

27. The light guide display of claim 25, wherein each shaped louver member has a textured surface.

28. The louver device of claim 25, wherein the shaped louver members are arranged such that the louver member segments are in staggered rows.

* * * * *

UNITED STATES PATENT AND TRADEMARK OFFICE
CERTIFICATE OF CORRECTION

PATENT NO. : 7,397,984 B2  Page 1 of 1
APPLICATION NO. : 11/263728
DATED : July 8, 2008
INVENTOR(S) : Huei Pei Kuo et al.

It is certified that error appears in the above-identified patent and that said Letters Patent is hereby corrected as shown below:

In column 12, line 9, in Claim 25, before "a cylindrical" delete "seciment" and insert -- segment --, therefor.

In column 12, line 9, in Claim 25, after "mirror" delete "seciment" and insert -- segment --, therefor.

Signed and Sealed this

Fourteenth Day of October, 2008

JON W. DUDAS
*Director of the United States Patent and Trademark Office*